No. 671,750. Patented Apr. 9, 1901.
J. Z. BENEDICT.
HORSESHOEING RACK.
(Application filed Feb. 14, 1901.)
(No Model.)
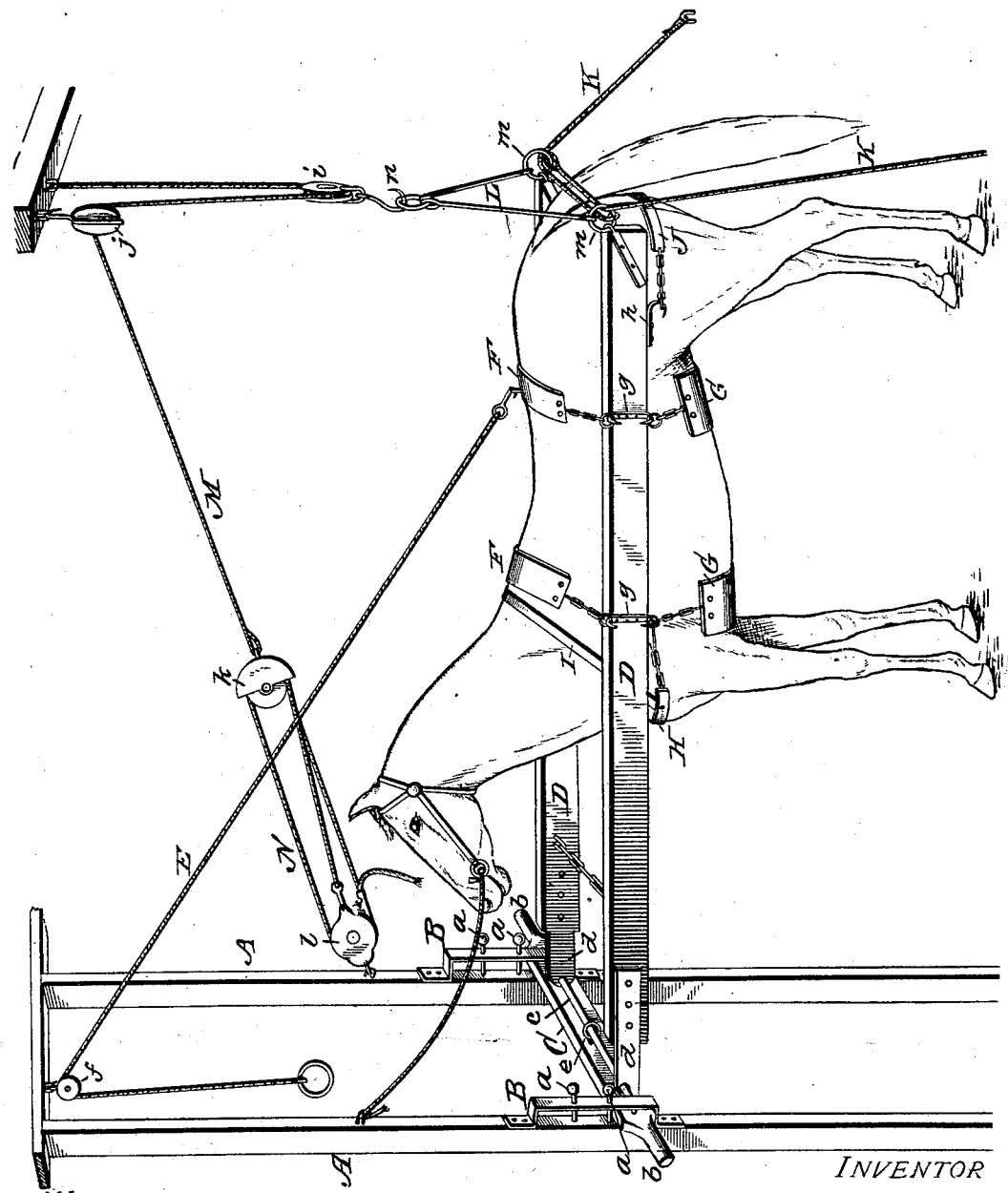
WITNESSES:
INVENTOR
James Z. Benedict.
BY Chas. H. Fowler
Attorney

UNITED STATES PATENT OFFICE.

JAMES Z. BENEDICT, OF ONEIDA, IOWA.

HORSESHOEING-RACK.

SPECIFICATION forming part of Letters Patent No. 671,750, dated April 9, 1901.

Application filed February 14, 1901. Serial No. 47,267. (No model.)

*To all whom it may concern:*

Be it known that I, JAMES Z. BENEDICT, a citizen of the United States, residing at Oneida, in the county of Delaware and State of Iowa, have invented certain new and useful Improvements in Horseshoeing-Racks; and I do hereby declare that the following is a full, clear, and exact description of the same, reference being had to the annexed drawings, making a part of this specification, and to the letters of reference marked thereon.

The present invention has for its object to provide a simple and effective rack for holding a horse while being shod; and it consists in a rack constructed substantially as shown in the drawing and hereinafter described and claimed.

In the accompanying drawing, which represents a perspective view of a rack constructed in accordance with my invention, showing a horse connected thereto, A designates two posts, which form together an upright frame, and to said posts are secured the stirrups B, of metal, pins $a$ being removably and adjustably connected to the stirrups to hold therein the transverse bar C. This bar is provided with handles $b$ at its ends to facilitate lifting it when it is desired to regulate the height thereof by means of the pins $a$. In the position shown in the drawing the bar is resting on the bottom of the stirrups, the lower one of the pins holding it in place, and by removing the lower pins or the upper pins, as the case may be, the bar may be midway of the ends of the stirrups or at the extreme upper ends thereof, thereby enabling the height of the bars to be regulated to adapt the shafts D to the height of the horse.

The bar C is provided with a longitudinal guide-rod $c$, to which are pivotally or loosely connected the shafts D through the medium of the plates $d$, secured to the ends of the shafts. Three eyebolts $e$ sustain the guide-rod $c$ at either end and at or near its center and limit the lateral movement of the shafts D, which movement is to admit of the proper lateral adjustment to bring the shafts against the sides of the horse.

Any suitable means may be provided for attaching the guide-rod $c$ to the bar C, and any suitable construction of stirrups may be used, as found best adapted to the purpose.

A suitable rope E, which extends over pulley $f$, may be used to swing the shafts D, with their attachments, up to the wall and out of the way when not required for use, the rope being shown as engaging with one of the two back-bands F. These back-bands F pass over the horse's back and connect with suitable hooks $g$ upon the outer sides of the shafts D, and belly-girths G are also provided, which are also connected to the hooks on the shafts.

A breast-collar H and neck-strap I are provided and also a breecher J, said breast-collar being connected to the forward ones of the hooks $g$ and the breecher to hooks $h$ on the shafts.

A suitable harness is provided for connecting the horse with the shafts, as above described; but I do not wish to be confined to any particular construction of harness, as it may be variously modified or changed without departing from the invention, the harness being adjustable to adapt it to the horse.

Suitable guy-ropes K have their ends connected, respectively, to the rings $m$ on the ends of the shafts D and to the floor, and when in use the ropes will hold the horse against kicking or moving sidewise.

Hanger-rods L of any preferred construction are detachably connected to the rings $m$ and the upper ends $a$ detachably connected to the hook $n$, depending from the pulley $i$, and one end of a rope M is secured to any stationary object, as shown, and engages the pulleys $i\,j$, the opposite end of the rope connecting with a block and tackle, as shown at N $k\,l$.

The block and tackle I have shown as fastened to one of the posts A; but it is evident that it may be secured to the floor or side of the building or to any other stationary object found most convenient.

The guy-ropes K may be brought into use on kicking or restless horses; but when the horse is to be lifted by the hanger-rods L, the rope M, and block and tackle, hereinbefore described, the guy-ropes are dispensed with.

The rack is easily adjusted to any size of horse or pony and is in many respects advantageous, the horse being lifted for shoeing without any discomfort to the animal, one-half of the horse's weight being thrown on the two upright posts, which is an economical gain in power.

While shoeing, any move the horse may make the shafts in their adjustment will adapt themselves to by their pivotal and adjustable connection with the transverse bar.

Upon the ends of the shafts D are rings $m$, and upon the pulley $i$ is a hook $n$ for making a connection between the pulley and the shafts, the guy-rope K engaging with the rings.

Having now fully described my invention, what I claim as new, and desire to secure by Letters Patent, is—

A horseshoeing-rack comprising a vertically-adjustable and horizontal bar and means for holding it in its adjusted position, a guide-rod secured to the bar, suitable shafts loosely mounted upon the rod and laterally adjustable thereon, and a suitable harness for connecting the horse with the shafts, and suitable ropes and pulleys connecting with said shafts, substantially as and for the purpose set forth.

In testimony that I claim the above I have hereunto subscribed my name in the presence of two witnesses.

JAMES Z. BENEDICT.

Witnesses:
W. F. MILLER,
E. B. HESS.